Patented Mar. 7, 1939

2,149,474

UNITED STATES PATENT OFFICE 2,149,474

4 - NITRO - 2-AMINO-1-HYDROXYNAPHTHA-LENE SULPHONIC ACIDS AND PROCESS OF MAKING SAME

Fritz Straub, Basel, Hermann Schneider, Riehen, and Peter Pieth, Basel, Switzerland, assignors to the firm Society of Chemical Industry in Basle, Basel, Switzerland No Drawing. Application May 12, 1937, Serial No. 142,281. In Switzerland May 14, 1936

12 Claims. (Cl. 260—509)

This invention relates to the manufacture of 4-nitro-2-amino-1-hydroxynaphthalene sulphonic acids by reducing 2:4-dinitro-1-hydroxynaphthalene sulphonic acids with a sulphur compound of an alkaline earth metal free from oxygen.

2.4- dinitro - 1 - hydroxynaphthalene sulphonic acids which are reduced according to the present process are for example such acids which contain a sulphonic acid group in the non-nitrated nucleus, for instance in 6-, 7- or 8-position. The reduction is advantageously carried out in an aqueous medium.

Sulphur compounds of the alkaline earth metals which are free from oxygen and suitable for the present process are for example alkaline earth metal salts of the hydrogen sulphide. Suitable salts are acid salts in which only one hydrogen atom of the hydrogen sulphide is replaced by a valency of an alkaline earth metal, as well as neutral salts in which both hydrogen atoms are substituted, and also mixed salts and mixtures of various kinds of salts. Such products are for example the salts of magnesium, calcium, strontium, and barium; the salts of magnesium and calcium, for instance magnesium sulphide and calcium hydrosulphide, are distinguished by a favorable effect.

Further, there may also be used alkaline earth metal polysulphides and the mixtures thereof with ordinary sulphides.

It is advantageous to produce such alkaline earth metal salts of the hydrogen sulphide in aqueous solution immediately prior to carrying out the reduction by reacting alkali sulphides with water-soluble alkaline earth salts, for example magnesium sulphate or calcium chloride.

The 4-nitro-2-amino - 1 - hydroxynaphthalene sulphonic acids are obtained in very good yield; they are valuable intermediate products.

The following examples illustrate the invention, the parts being by weight unless otherwise stated:—

Example 1

336 parts of sodium 2.4-dinitro-1-hydroxynaphthalene-8-sulphonate are stirred with 2000 parts of cold water. In the mean time a cold solution of 720 parts of crystallized sodium sulphide in 1500 parts of water is mixed with a solution of 500 parts of crystallized magnesium chloride in 1000 parts of water. The suspension thus obtained is then run into a suspension of the dinitro-compound. The whole is heated while stirring to 40° C. and kept for 2 hours at 40–50° C. The deep brown-red solution produced is acidified with hydrochloric acid and after cooling the 4-nitro-2-amino-1-hydroxynaphthalene-8-sulphonic acid and sulphur which have separated are filtered. For isolating the pure acid the sulphonic acid and sulphur are suspended in cold water and caustic soda solution is added until the reaction is feebly alkaline and the whole is filtered with exclusion of air as far as possible into a diluted hydrochloric acid, whereby the 4-nitro-2-amino-1-hydroxynaphthalene-8-sulphonic acid is precipitated. It is filtered, washed with water and dried.

In analogous manner 2.4-dinitro-1-hydroxynaphthalene-6- or -7-sulphonic acid may be reduced to 4-nitro-2-amino-1-hydroxynaphthalene-6- or -7-sulphonic acid.

Example 2

336 parts of sodium 2.4-dinitro-1-hydroxynaphthalene-7-sulphonate are disolved in 2500 parts of hot water. At 50° C. there is introduced into the solution, while stirring, a solution of magnesium hydrosulphide freshly produced by mixing 1000 parts by volume of sodium hydrosulphide solution, containing 224 parts of NaSH of 100 per cent. strength, with 1200 parts by volume of magnesium sulphate solution, containing 590 parts of crystallized magnesium sulphate.

The whole is stirred slowly whereby the yellow suspension having a temperature of about 42° C. dissolves after a short time with rise of temperature and red coloration. The temperature is kept at 50–55° C. until the spot test on paper does no longer show a yellow edge, which is the case after 10–15 minutes. The mixture is quickly cooled to 20–30° C., acidified vigorously with hydrochloric acid, and a yellow suspension thus obtained is filtered after stirring for 2–3 hours. It is washed repeatedly with sodium chloride solution of 10 per cent. strength, containing hydrochloric acid, and the 4-nitro-2-amino-1-hydroxynaphthalene-7-sulphonic acid obtained in a yield of about 82 per cent. is finally freed from the sulphur which has also precipitated by rapid redissolution from a cold sodium carbonate solution.

Example 3

15.7 parts of 2.4-dinitro-1-hydroxynaphthalene-6-sulphonic acid are dissolved in 150 parts of water at 50° C. and made feebly alkaline with little caustic soda solution. To this solution there is added a mixture consisting of 50 parts of an aqueous solution containing 11.2 parts of NaSH and of 60 parts of solution containing 14.4 parts of MgSO₄. The temperature drops at first to 40–42° C., but rises subsequently to 50–55° C. due to the heat of reaction which becomes free. The whole is stirred for a short time (5 minutes) at this temperature, cooled quickly to 10–15° C. and acidified with hydrochloric acid. The 4-nitro-2-amino-1-hydroxynaphthalene - 6 - sulphonic acid is to the largest part precipitated by addition of potassium chloride and freed from sulphur by redissolution from water.

What we claim is:

1. Process for the manufacture of 4-nitro-2-amino-1-hydroxynaphthalene sulphonic acid, consisting in reducing in an aqueous medium 2.4-dinitro-1-hydroxynaphthalene sulphonic acids with members of the group consisting of sulphides, polysulphides and hydrosulphides of the alkaline earth metals.

2. Process for the manufacture of 4-nitro-2-amino-1-hydroxynaphthalene sulphonic acid, consisting in reducing in an aqueous medium 2.4-dinitro-1-hydroxynaphthalene sulphonic acids with alkaline earth metal salts of hydrogen sulphide.

3. Process for the manufacture of 4-nitro-2-amino-1-hydroxynaphthalene sulphonic acid, consisting in reducing in an aqueous medium 2.4-dinitro-1-hydroxynaphthalene sulphonic acids with sulphides of the alkaline earth metal salts.

4. Process for the manufacture of 4-nitro-2-amino-1-hydroxynaphthalene sulphonic acid, consisting in reducing 2.4-dinitro-1-hydroxynaphthalene sulphonic acids with aqueous suspensions of alkaline earth metal sulphides obtained by the reaction of alkali metal sulphides and soluble inorganic alkaline earth metal salts in aqueous solution.

5. Process for the manufacture of 4-nitro-2-amino-1-hydroxynaphthalene sulphonic acid, consisting in reducing in an aqueous medium 2.4-dinitro-1-hydroxynaphthalene sulphonic acids with members of the group consisting of sulphides, polysulphides and hydrosulphides of metals selected from the group consisting of magnesium and calcium.

6. Process for the manufacture of 4-nitro-2-amino-1-hydroxynaphthalene sulphonic acid, consisting in reducing in an aqeous medium 2.4-dinitro-1-hydroxynaphthalene sulphonic acids with salts of hydrogen sulphide of metals selected from the group consisting of magnesium and calcium.

7. Process for the manufacture of 4-nitro-2-amino-1-hydroxynaphthalene sulphonic acid, consisting in reducing in an aqueous medium 2.4-dinitro-1-hydroxynaphthalene sulphonic acids with sulphides of metals selected from the group consisting of magnesium and calcium.

8. Process for the manufacture of 4-nitro-2-amino-1-hydroxynaphthalene sulphonic acid, consisting in reducing 2.4-dinitro-1-hydroxynaphthalene sulphonic acids with aqueous suspensions of sulphides of the metals selected from the group consisting of magnesium and calcium obtained by the reaction of alkali metal sulphides and soluble inorganic salts of the above named metals.

9. Process for the manufacture of 4-nitro-2-amino-1-hydroxynaphthalene sulphonic acid, consisting in reducing in an aqueous medium 2.4-dinitro-1-hydroxynaphthalene sulphonic acids with magnesium sulphide.

10. Process for the manufacture of 4-nitro-2-amino-1-hydroxynaphthalene sulphonic acid, consisting in reducing 2.4-dinitro-1-hydroxynaphthalene sulphonic acids with a suspension of magnesium sulphide obtained by the reaction of aqueous solutions of sodium sulphide and magnesium sulphate.

11. The 1-hydroxy-2-amino-4-nitronaphthalene sulphonic acids of the general formula

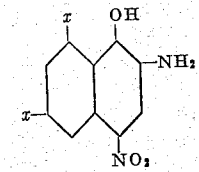

wherein one $x$ represents a sulphonic acid group and the other $x$ represents hydrogen.

12. The 1-hydroxy-2-amino-4-nitronaphthalene-8-sulphonic acid.

FRITZ STRAUB.
HERMANN SCHNEIDER.
PETER PIETH.